US012541209B2

(12) United States Patent
Uratsuji

(10) Patent No.: US 12,541,209 B2
(45) Date of Patent: Feb. 3, 2026

(54) ROUTE GENERATION DEVICE, ROUTE GENERATION METHOD, AND STORAGE MEDIUM

(71) Applicant: HONDA MOTOR CO., LTD., Tokyo (JP)

(72) Inventor: Yuki Uratsuji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 18/395,872

(22) Filed: Dec. 26, 2023

(65) Prior Publication Data

US 2024/0219914 A1 Jul. 4, 2024

(30) Foreign Application Priority Data

Dec. 28, 2022 (JP) ................... 2022-212463

(51) Int. Cl.
*G05D 1/229* (2024.01)
(52) U.S. Cl.
CPC .................. *G05D 1/2297* (2024.01)
(58) Field of Classification Search
CPC .................................................. G05D 1/2297
USPC ............................................................ 701/25
See application file for complete search history.

(56) References Cited

U.S. PATENT DOCUMENTS

2021/0020045 A1\* 1/2021 Huang .................. G05D 1/692
2021/0084812 A1\* 3/2021 Matus .................. A01D 34/008
2024/0069556 A1\* 2/2024 Saito .................... G05D 1/0044
2024/0094734 A1\* 3/2024 Szubbocsev ......... G05D 1/0088

FOREIGN PATENT DOCUMENTS

| JP | 2012-118027 | | 6/2012 |
| JP | 2012118027 A | \* | 6/2012 |
| JP | 2019-185293 | | 10/2019 |
| JP | 2020-042853 | | 3/2020 |
| JP | 2021-081269 | | 5/2021 |
| JP | 2022-026601 | | 2/2022 |

OTHER PUBLICATIONS

English Translation for JP2012118027A (Year: 2025).\*
Japanese Office Action for Japanese Patent Application No. 2022-212463 mailed Jul. 16, 2024.
Japanese Office Action for Japanese Patent Application No. 2022-212463 mailed Oct. 22, 2024.

\* cited by examiner

*Primary Examiner* — Mahmoud S Ismail
(74) *Attorney, Agent, or Firm* — Amin, Turocy & Watson, LLP

(57) ABSTRACT

A route generation device includes a processing section that generates a movement route of a moving body including a passing point and a route line set on a map. The processing section changes the position of at least one of the passing point and the route line on the movement route that has been created beforehand on the basis of data of a movement trajectory when the moving body moves in a real environment of a predetermined area. When changing the position of the passing point of the movement route on the basis of the data of the movement trajectory, the processing section moves the passing point to a closest position on the movement trajectory.

9 Claims, 3 Drawing Sheets

ROUTE GENERATION DEVICE, ROUTE GENERATION METHOD, AND STORAGE MEDIUM

CROSS-REFERENCE TO RELATED APPLICATION

The present application claims priority based on Japanese Patent Application No. 2022-212463 filed in Japan on Dec. 28, 2022, the entire contents of which are incorporated herein by reference.

BACKGROUND OF THE INVENTION

Field of the Invention

The present invention relates to a route generation device, a route generation method, and a storage medium.

Description of Related Art

There has been conventionally known, for example, a device that recognizes a route designated by a user on the basis of a continuous line drawn on a captured image by the user, and corrects the recognized route on the basis of a non-travelable range, thereby generating a travel route (see, for example, Japanese Unexamined Patent Application, First Publication No. 2022-026601).

SUMMARY OF THE INVENTION

In the above-described device of the conventional technique, after the route based on the non-travelable range is corrected, it is desirable to verify whether it is possible to travel the route by causing a vehicle to travel in a real environment. However, in a case where the travel verification is carried out in the real environment, for example, it is necessary to repeat the route correction in accordance with fine position adjustments or the like and the travel verification in the real environment, in some cases. Hence, there is a problem that the number of processing steps increases.

An aspect according to the present invention has an object to provide a route generation device, a route generation method, and a storage medium capable of suppressing an increase in the number of processing steps and improving the efficiency of route generation.

In order to solve the above problem and achieve the object, the present invention adopts the following aspects.

(1) A route generation device according to one aspect of the present invention is a route generation device for an autonomous moving body capable of autonomously moving, a movement route of the autonomous moving body including a passing point and a route line set on a map, the route generation device including: a processing section configured to change a position of at least one of the passing point and the route line of the movement route of the autonomous moving body on the basis of data of a movement trajectory when a moving body moves in a real environment of a predetermined area.

(2) In the above (1), the processing section may move the passing point to a closest position on the movement trajectory, when changing the position of the passing point on the basis of the data of the movement trajectory.

(3) In the above (1) or (2), the data of the movement trajectory may be generated by the moving body moving in the real environment, regardless of the passing point or the route line.

(4) In the above (3), the data of the movement trajectory may be generated by the autonomous moving body moving in the real environment in accordance with an autonomous movement or a manual operation.

(5) In the above (3), the data of the movement trajectory may be generated by the moving body that is a manned vehicle moving in the real environment.

(6) A route generation method according to one aspect of the present invention is a route generation method performed by an electronic device including a processing section that generates a movement route of an autonomous moving body capable of autonomously moving, the movement route of the autonomous moving body including a passing point and a route line set on a map, the route generation method including: a step of changing a position of at least one of the passing point and the route line of the movement route of the autonomous moving body on the basis of data of a movement trajectory when a moving body moves in a real environment of a predetermined area, performed by the electronic device.

(7) In the above (6), the route generation method may further include a step of moving the passing point to a closest position on the movement trajectory, when changing the position of the passing point on the basis of the data of the movement trajectory, performed by the electronic device.

(8) In the above (6) or (7), the data of the movement trajectory may be generated by the moving body moving in the real environment, regardless of the passing point or the route line.

(9) In the above (8), the data of the movement trajectory may be generated by the autonomous moving body moving in the real environment in accordance with an autonomous movement or a manual operation.

(10) In the above (8), the data of the movement trajectory may be generated by the moving body that is a manned vehicle moving in the real environment.

(11) A non-transitory computer-readable storage medium, according to one aspect of the present invention, storing a program for causing a computer of an electronic device including a processing section that generates a movement route of an autonomous moving body capable of autonomously moving to execute: a step of changing a position of at least one of a passing point and a route line of the movement route of the autonomous moving body on the basis of data of a movement trajectory when a moving body moves in a real environment of a predetermined area, the movement route of the autonomous moving body including the passing point and the route line set on a map.

According to the above (1), on the movement route formed with the passing point set on the map and the route line connecting adjacent passing points, the processing section changes the position of at least one of the passing point and the route line with use of the data of the movement trajectory. This enables suppression of an increase in the number of processing steps and improvement in efficiency of route generation, as compared with, for example, a case where a movement possibility or impossibility is verified in the real environment without use of the data of the movement trajectory.

In the case of the above (2), it becomes possible to suppress an increase in change amount (distance) when changing the position of the passing point onto the movement trajectory, and to suppress the need for repetitive position corrections.

In the case of the above (3), it becomes possible to suppress a decrease in verification accuracy in verifying a movement possibility or impossibility based on the data of the movement trajectory, as compared with, for example, a case of moving in the real environment in accordance with a route generated beforehand.

In the case of the above (4) or (5), it becomes possible to improve the efficiency of the route generation while appropriately verifying the movement possibility or impossibility for an autonomous movement of an autonomous moving body, a movement in accordance with a manual operation, or a movement of the moving body in accordance with an operation by an occupant.

According to (6), on the movement route formed with the passing point set on the map and the route line connecting adjacent passing points, the electronic device changes the position of at least one of the passing point and the route line with use of the data of the movement trajectory. This enables suppression of an increase in the number of processing steps and improvement in efficiency of route generation, as compared with, for example, a case where a movement possibility or impossibility is verified in the real environment without use of the data of the movement trajectory.

In the case of the above (7), it becomes possible to suppress an increase in change amount (distance) when changing the position of the passing point onto the movement trajectory, and to suppress the need for repetitive position corrections.

In the case of the above (8), it becomes possible to suppress a decrease in verification accuracy in verifying the movement possibility or impossibility based on the data of the movement trajectory, as compared with, for example, a case of moving in the real environment in accordance with a route generated beforehand.

In the case of the above (9) or (10), it becomes possible to improve the efficiency of the route generation while appropriately verifying the movement possibility or impossibility for an autonomous movement of an autonomous moving body, a movement in accordance with a manual operation, or a movement of the moving body in accordance with an operation by an occupant.

According to (11), on the movement route formed with the passing point set on the map and the route line connecting adjacent passing points, the computer of the electronic device changes the position of at least one of the passing point and the route line with use of the data of the movement trajectory. This enables suppression of an increase in the number of processing steps and improvement in efficiency of route generation, as compared with, for example, a case where a movement possibility or impossibility is verified in the real environment without use of the data of the movement trajectory.

DETAILED DESCRIPTION OF THE INVENTION

Hereinafter, a route generation device according to an embodiment of the present invention will be described with reference to the accompanying drawings.

The route generation device according to an embodiment generates, for example, a route map indicating a movement route set on two-dimensional map data indicating a movable region and an immovable region of a moving body such as a vehicle or a moving work machine.

Figure 1:
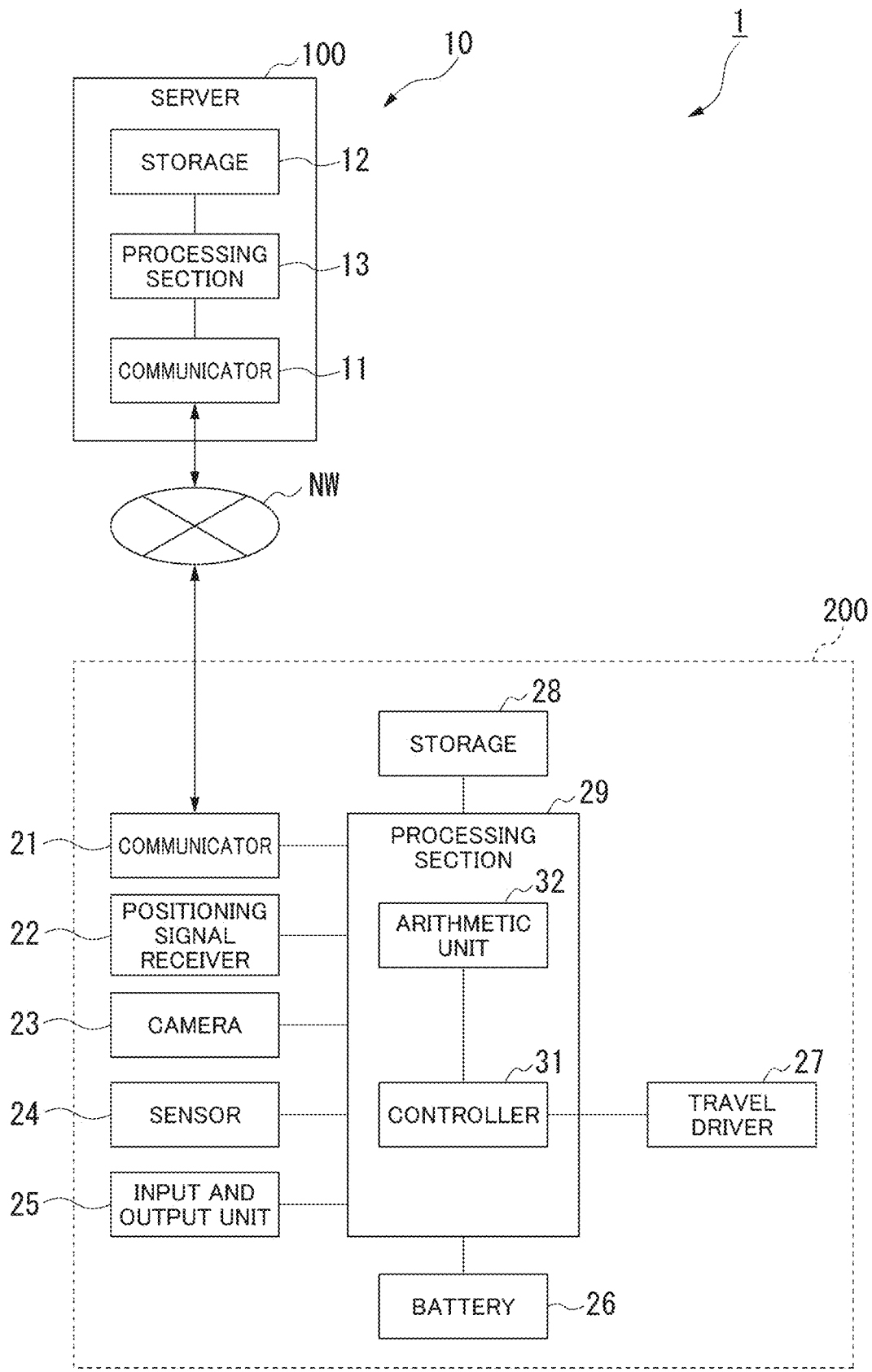
FIG. 1 is a block diagram illustrating a functional composition of a route generation system including a route generation device according to an embodiment of the present invention.

FIG. 1 is a block diagram illustrating a functional composition of a route generation system 1 including a route generation device 10 according to an embodiment.

As illustrated in FIG. 1, the route generation system 1 includes, for example, a server 100 and a moving body 200. The server 100 and the moving body 200 are connected with each other through, for example, a wired or wireless communication network (network) NW. The communication network NW is, for example, the Internet, a mobile communication network, a local area network (LAN), a wide area network (WAN), or the like. For example, the LAN is a wired local area network (LAN) of a predetermined standard such as Ethernet or a wireless LAN of various standards such as Wi-Fi (registered trademark) and Bluetooth (registered trademark).

The server 100 includes, for example, a communicator 11, a storage 12, and a processing section 13. The storage 12 and the processing section 13 of the server 100 constitute, for example, the route generation device 10 according to an embodiment.

The communicator 11 communicates with, for example, the moving body 200.

The storage 12 stores, for example, various types of information, a predetermined program, and the like.

The processing section 13 includes a software function unit that functions in accordance with a predetermined program executed by a processor such as a central processing unit (CPU). The software functional unit serves as an electronic control unit (ECU) including a processor such as a CPU, a read only memory (ROM) that stores a program, a random access memory (RAM) that temporarily stores data, and an electronic circuit such as a timer. At least a part of the processing section 13 may be an integrated circuit such as a large scale integration (LSI).

The processing section 13 creates, for example, a route (movement route) of the moving body 200 that is composed of passing points and route lines set on a map. A passing point on the map is a so-called location point (node), and a route line on the map is a so-called route (edge). For example, the processing section 13 changes the position of at least one of the passing point and the route line of the movement route that has been created beforehand on the basis of data of a movement trajectory acquired from the moving body 200 or the like.

The data of the movement trajectory is data of time-series changes of the position acquired when the moving body 200 moves in a real environment of a predetermined area. The data of the movement trajectory is generated by, for example, the moving body 200 moving in the real environment, regardless of the passing points or the route lines of the movement route that has been created beforehand. The data of the movement trajectory is generated by the processing section 13 of the server 100 or a processing section 29 of the moving body 200 to be described later on the basis of, for example, information or the like of the position of the moving body 200.

For example, in a case where the passing point or the route line of the movement route that has been created beforehand deviates from the movement trajectory of the moving body 200 in the real environment, the processing section 13 moves the passing point or the route line of the movement route onto the movement trajectory.

The moving body 200 is, for example, a manned or unmanned vehicle, a moving work machine that performs predetermined work while autonomously moving, any other robot, or the like. The moving body 200, for example, moves autonomously, moves in accordance with a manual operation (for example, a remote operation or the like) by an operator, or moves in accordance with a driving operation by an occupant.

The manned vehicle may be, for example, another type of a moving body different from an autonomous moving body capable of autonomously moving. Such another type of the moving body may be, for example, a four-wheeled vehicle or a side-by-side vehicle on which an object detection device such as a sonar, a radar device, and a finder, and a positioning system and the like are mounted. The sonar, the radar device, and the finder respectively emit ultrasonic waves, electromagnetic waves, and light to the periphery of the object, and detect reflection or scattering from the object, thereby detecting a distance, a position, or the like to the object. The finder is, for example, a light detection and ranging or laser imaging detection and ranging (LiDAR).

The manual operation by the operator may include, for example, an operation by the operator with a remote controller (radio controller) or the like while the operator is looking at the autonomous moving body on its side in the real environment, and a remote operation by the operator from a remote place utilizing image communication or the like.

The moving body 200 includes, for example, a communicator 21, a positioning signal receiver 22, a camera 23, a sensor 24, an input and output unit 25, a battery 26, a travel driver 27, a storage 28, and a processing section 29. The processing section 29 includes, for example, a controller 31 and an arithmetic unit 32.

The communicator 21 communicates with the server 100, for example.

The positioning signal receiver 22 includes, for example, an antenna for a global navigation satellite system (GNSS) such as a global positioning system (GPS). The positioning signal receiver 22 detects the current position or the like of the moving body 200 on the basis of a positioning signal received by the antenna, and outputs a detection signal to the processing section 40.

The camera 23 is, for example, a digital camera including a solid-state imaging element such as a charge coupled device (CCD) or a complementary metal oxide semiconductor (CMOS). The camera 23 outputs, to the processing section 29, image data obtained by, for example, imaging the outside world including a forward side of the moving body 200 in a visible light region, an infrared region, and the like.

The sensor 24 includes, for example, an acceleration sensor that detects acceleration of the moving body 200, a gyro sensor that detects pitch, roll, yaw, and the like of the moving body 200, a voltage sensor, a current sensor, a temperature sensor, and the like each of which detect a state of the battery 26. The sensor 24 outputs a detection signal to the processing section 29.

The sensor 24 may include, for example, an object detection device capable of acquiring three-dimensional point group data of the sonar, the radar device, and the finder.

The input and output unit 25 includes, for example, an input and output device that is a user interface, a connection terminal for power transmission and reception, and a connection terminal connected with various external devices. The input and output device includes, for example, a display device such as a liquid crystal display or an organic electro luminescence (EL) display, an input device such as a button or a touch panel that accepts an input operation by an operator's finger, a microphone for voice input, a speaker for sound output, and the like.

The battery 26 includes, for example, a plurality of battery cells connected in series or in parallel. The battery cell is, for example, a secondary battery such as a lead storage battery, a lithium-ion battery, a sodium-ion battery, a nickel hydrogen battery, and an all solid battery, a capacitor such as an electric double layer capacitor, or a composite battery in which a secondary battery and a capacitor are combined. The battery cell repeats charging and discharging.

The travel driver 27 includes, for example, an electric motor that outputs the power to travel, a power transmission mechanism that transmits the power of the electric motor to drive wheels, and the like.

The storage 28 stores, for example, various types of information, a predetermined program, and the like.

The processing section 29 includes a software function unit that functions in accordance with a predetermined program executed by a processor such as a central processing unit (CPU). The software functional unit serves as an electronic control unit (ECU) including a processor such as a CPU, a read only memory (ROM) that stores a program, a random access memory (RAM) that temporarily stores data, and an electronic circuit such as a timer. At least a part of the processing section 29 may be an integrated circuit such as a large scale integration (LSI).

The controller 31 controls the operation of the moving body 200 on the basis of, for example, information acquired from the communicator 21, the positioning signal receiver 22, the camera 23, the sensor 24, the input and output unit 25, and the storage 28.

The arithmetic unit 32 performs various types of arithmetic processing on the basis of, for example, information acquired from the communicator 21, the positioning signal receiver 22, the camera 23, the sensor 24, the input and output unit 25, and the storage 28. For example, the arithmetic unit 32 generates data of a movement trajectory when the moving body 200 moves in a real environment of a predetermined area.

Operation of Route Generation System

Figure 2:
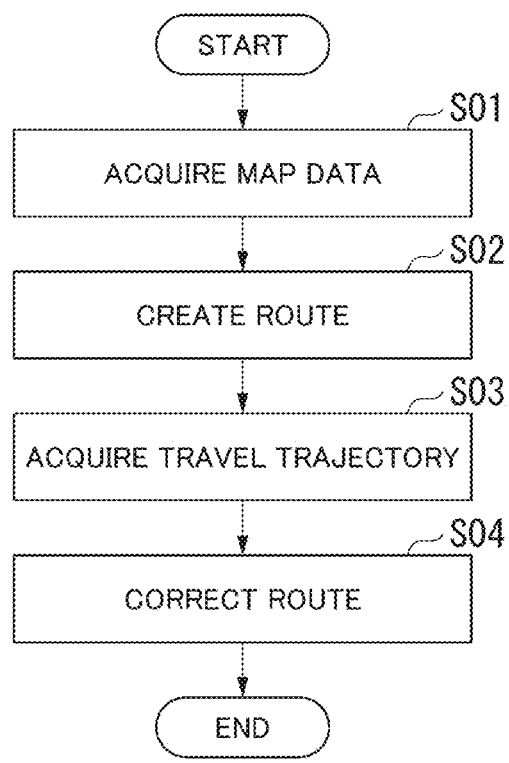
FIG. 2 is a flowchart illustrating an operation of the route generation system according to an embodiment of the present invention.
Figure 3:
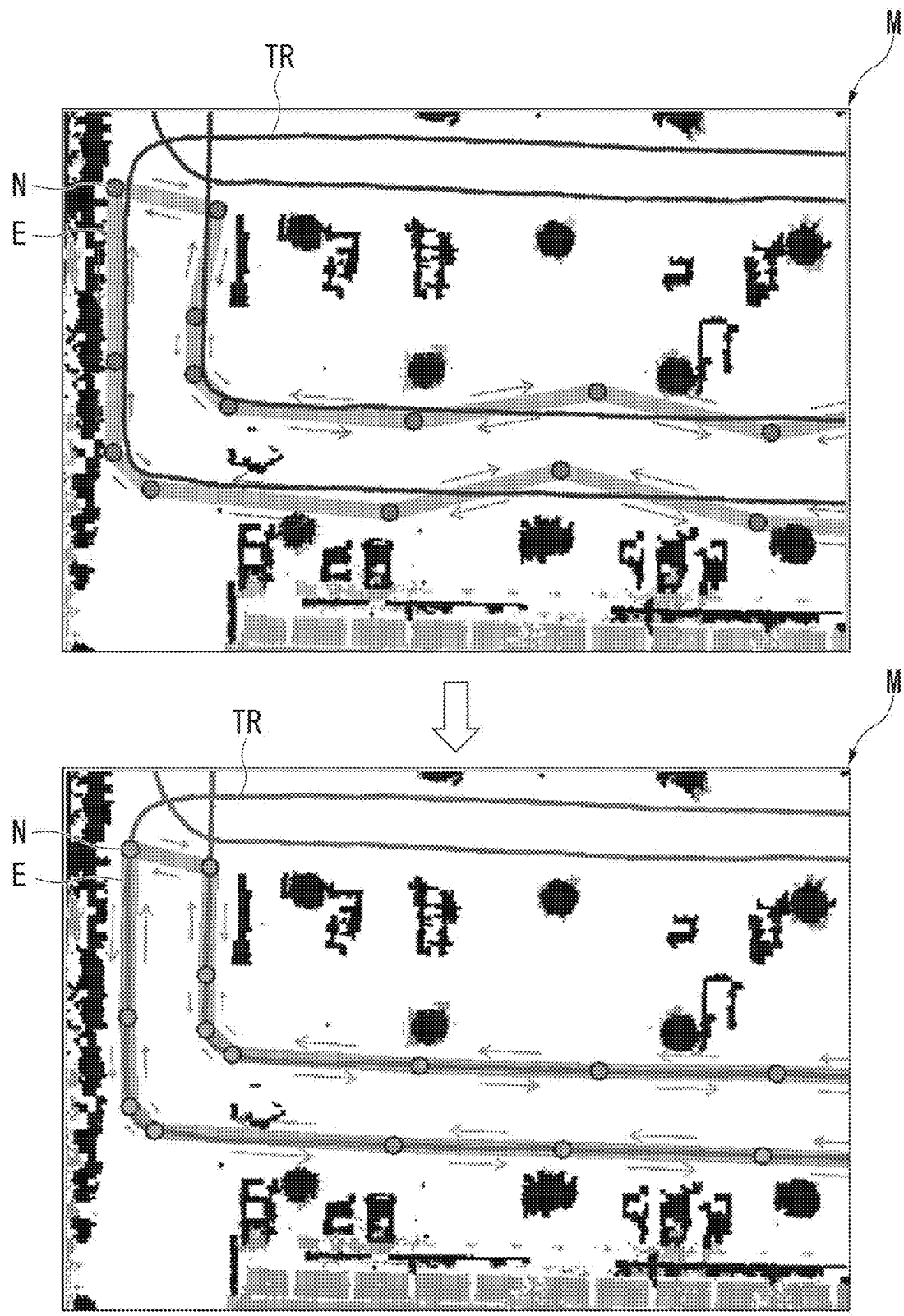
FIG. 3 is a diagram illustrating an example of a route map before and after route correction is made by the route generation system according to an embodiment of the present invention.

In the following, an operation (a route generation method) of the route generation system 1 according to an embodiment will be described. FIG. 2 is a flowchart illustrating the operation of the route generation system 1 according to an embodiment. FIG. 3 is a diagram illustrating an example of a route map before and after route correction is made by the route generation system 1 according to an embodiment.

First, in step S01 illustrated in FIG. 2, the processing section 13 of the server 100 acquires map data.

Next, in step S02, the processing section 13 creates a movement route of the moving body 200 on the acquired map data. The processing section 13 transmits the created movement route to the moving body 200.

For example, as illustrated in FIG. 3, the processing section 13 creates a movement route with a location point (node) N and a route (edge) E connecting adjacent location points N, on a two-dimensional map M in accordance with the map data.

Next, in step S03 illustrated in FIG. 2, the processing section 13 acquires data of a movement (travel) trajectory generated when the moving body 200 moves in reality in a real environment of a predetermined area based on the created movement route.

Next, in step S04, the processing section 13 corrects the movement route that has been created beforehand on the basis of the acquired data of the movement trajectory. For example, as illustrated in FIG. 3, the processing section 13 corrects the movement route to superimpose the location point (node) N and the route (edge) E on the acquired movement trajectory TR on the two-dimensional map M. For example, when changing the position of the location point (node) N, the processing section 13 moves the location point (node) N to the closest position on the movement trajectory TR. That is, for example, the processing section 13 moves the location point (node) N in the normal direction of the movement trajectory TR, thereby moving the location point (node) N onto the movement trajectory TR. Then, the processing section 13 advances the processing to the end.

As described above, according to the route generation device 10 and the route generation method according to an embodiment, the positions of the passing point and the route line of the movement route that has been created beforehand are changed on the basis of the data of the movement trajectory when the moving body 200 moves in the real environment of the predetermined area. This enables suppression of an increase in the number of processing steps caused by the need for repetitive position corrections and improvement in efficiency of route generation, as compared with, for example, a case where a movement possibility or impossibility is verified in the real environment without use of the data of the movement trajectory.

The position of the passing point of the movement route that has been created beforehand is changed to the closest position on the movement trajectory. Therefore, it becomes possible to suppress an increase in the change amount (distance) when the position of the passing point is changed onto the movement trajectory, and to suppress the need for repetitive position corrections.

The data of the movement trajectory is generated by the moving body 200 moving in the real environment, regardless of the passing point or the route line of the movement route that has been created beforehand. Therefore, it becomes possible to suppress a decrease in verification accuracy in verifying the movement possibility or impossibility based on the data of the movement trajectory, as compared with, for example, a case where the moving body 200 moves in the real environment along the movement route that has been created beforehand.

Modifications

Hereinafter, modifications of the embodiments will be described. The same parts as those in the above-described embodiments are denoted by the same reference numbers, and their descriptions will be omitted or simplified.

In the above-described embodiment, when changing the position of the passing point of the movement route that has been created beforehand on the basis of the data of the movement trajectory, the processing section 13 moves the passing point to the closest position on the movement trajectory, but the present invention is not limited to this. For example, in a case where the position of the passing point in the movement route before correction is not an appropriate position on the movement trajectory but is closest to another inappropriate position, the passing point may be moved to an appropriate position on the movement trajectory with reference to the positions of the passing points adjacent on the front and the rear, the route line, or the like.

In the above-described embodiment, the route generation device 10 is composed of the storage 12 and the processing section 13 of the server 100, but the present invention is not limited to this. The route generation device 10 is not limited to the server 100, and may be provided in another device, equipment, or the like. For example, the route generation device 10 may be composed of another processing device such as the processing section 29 of the moving body 200.

A program for achieving all or some of the functions of the route generation system 1 in the present invention may be recorded in a computer-readable recording medium, the program recorded in such a recording medium may be read and executed by a computer system, and all or some of the processes may be performed by the route generation system 1. The "computer system" mentioned herein includes an OS and hardware such as peripheral devices. The "computer system" also includes a WWW system including a website providing environment (or display environment). The "computer-readable recording medium" refers to a portable medium such as a flexible disk, a magneto-optical disk, a ROM, and a CD-ROM, and a storage device such as a hard disk built in a computer system. Furthermore, the "computer-readable recording medium" includes a medium that holds a program for a certain period of time, such as a volatile memory (RAM) inside a computer system that serves as a server or a client, when the program is transmitted through a network such as the Internet or a communication line such as a telephone line.

The above program may be transmitted from a computer system in which the program is stored in a storage device or the like to another computer system through a transmission medium or on transmission waves in the transmission medium. Here, the "transmission medium" for transmitting a program refers to a medium having a function of transmitting information, such as a network (communication network) such as the Internet or a communication channel (communication line) such as a telephone line. The program may be made for achieving some of the above-described functions. Furthermore, a program capable of achieving the above-described functions in combination with a program already recorded in the computer system, that is, a so-called differential file (differential program) may be applicable.

The embodiments in the present invention have been presented by way of examples, and there is no intention of limiting the scope of the invention. These embodiments can be implemented in various other forms, and various omissions, substitutions, and changes can be made without departing from the gist of the invention. These embodiments and modifications are included in the scope and gist of the invention, and are also included in the invention described in the claims and the equivalent scope thereof.

What is claimed is:

1. A route generation device for an autonomous moving body capable of autonomously moving, wherein
   a movement route for the autonomous moving body
      includes a passing point and a route line set on a map, the route generation device comprising:
a processor configured to; change a position of at least one of the passing point and the route line of the movement route of the autonomous moving body based on data of a movement trajectory when a moving body moves in a real environment of a predetermined area,
superimpose the passing point and the route line on the movement trajectory in the data of the trajectory, and move the passing point to a closest position on the movement trajectory, when changing the position of the passing point,
wherein the movement route includes the passing point after the passing point has been moved to the closest position on the movement trajectory and the movement trajectory becomes the movement route where the autonomous moving body moves to not only when the autonomous moving body becomes disabled; and
cause the autonomous moving body to move along the movement route.

2. The route generation device according to claim 1, wherein
the data of the movement trajectory is generated by the moving body moving in the real environment, regardless of the passing point or the route line.

3. The route generation device according to claim 2, wherein
the data of the movement trajectory is generated by the autonomous moving body moving in the real environment in accordance with an autonomous movement or a manual operation.

4. The route generation device according to claim 2, wherein
the data of the movement trajectory is generated by the moving body that is a manned vehicle moving in the real environment.

5. A route generation method performed by an electronic device including a processor that generates a movement route for an autonomous moving body capable of autonomously moving, wherein
the movement route of the autonomous moving body includes a passing point and a route line set on a map,
the route generation method comprising:
a step of changing a position of at least one of the passing point and the route line of the movement route of the autonomous moving body based on data of a movement trajectory when a moving body moves in a real environment of a predetermined area, performed by the electronic device;
a step of superimposing the passing point and the route line on the movement trajectory in the data of the movement trajectory, and moving the passing point to a closest position on the movement trajectory, when changing the position of the passing point,
wherein the movement route includes the passing point at the passing point has been moved to the closest position on the movement trajectory becomes the movement route where the autonomous moving body move to not only when the autonomous moving body becomes disabled; and
a step of causing the autonomous moving body to move along the movement route.

6. The route generation method according to claim 5, wherein
the data of the movement trajectory is generated by the moving body moving in the real environment, regardless of the passing point or the route line.

7. The route generation method according to claim 6, wherein
the data of the movement trajectory is generated by the autonomous moving body moving in the real environment in accordance with an autonomous movement or a manual operation.

8. The route generation method according to claim 6, wherein
the data of the movement trajectory is generated by the moving body that is a manned vehicle moving in the real environment.

9. A non-transitory computer-readable storage medium storing a program for causing a computer of an electronic device including a processor that generates a movement route of an autonomous moving body capable of autonomously moving to execute:
a step of changing a position of at least one of a passing point and a route line of the movement route of the autonomous moving body based on data of a movement trajectory when a moving body moves in a real environment of a predetermined area, the movement route of the autonomous moving body including the passing point and the route line set on a map;
a step of superimposing the passing point and the route line on the movement trajectory in the data of the movement trajectory, and moving the passing point to a closest position on the movement trajectory, when changing the position of the passing point,
wherein the movement route includes the passing point after the passing point has moved to the closest position on the movement trajectory and becomes the movement route where the autonomous moving body moves to not only when the autonomous moving body becomes disabled; and
a step of causing the autonomous moving body to move along the movement route.

* * * * *